United States Patent [19]

Naudet

[11] Patent Number: 4,844,694
[45] Date of Patent: Jul. 4, 1989

[54] FASTENING SPINDLE AND METHOD OF ASSEMBLY FOR ATTACHING ROTOR ELEMENTS OF A GAS-TURBINE ENGINE

[75] Inventor: Jacky Naudet, Boudoufle, France

[73] Assignee: Societe Nationale d'Etude et de Construction de Moteurs d'Aviation (SNECMA), Paris, France

[21] Appl. No.: 127,398

[22] Filed: Dec. 2, 1987

[30] Foreign Application Priority Data

Dec. 3, 1986 [FR] France .................. 86 16875

[51] Int. Cl.$^4$ .......................... F01D 5/06
[52] U.S. Cl. ..................... 416/198 A; 416/201 R; 416/214 A; 415/199.5
[58] Field of Search ...... 416/198 A, 214 A, DIG. 14, 416/200 A, 201 R; 415/199.5, 172 A; 411/389

[56] References Cited

U.S. PATENT DOCUMENTS

| | | | |
|---|---|---|---|
| 1,926,925 | 9/1933 | Wescott | 411/389 X |
| 2,425,935 | 8/1947 | Hayman | 411/389 X |
| 2,525,217 | 10/1950 | Glitsch | 411/389 X |
| 2,662,685 | 12/1953 | Blanc | 416/198 A X |
| 3,249,293 | 5/1966 | Koff | 416/220 R X |
| 3,447,822 | 10/1967 | King | 287/53 |
| 3,688,371 | 9/1972 | Koff | 416/198 A X |
| 3,936,222 | 2/1976 | Asplund et al. | 416/220 R X |
| 4,480,513 | 11/1984 | McCauley et al. | 411/389 X |
| 4,688,378 | 8/1987 | Harris | 60/39.75 X |
| 4,729,707 | 3/1988 | Takahashi | 411/389 |
| 4,747,750 | 5/1988 | Chlus et al. | 415/172 A |

FOREIGN PATENT DOCUMENTS

| | | | |
|---|---|---|---|
| 513654 | 6/1955 | Canada | 416/198 A |
| 619513 | 5/1961 | Canada | 416/193 A |
| 683867 | 6/1930 | France . | |
| 1056070 | 2/1954 | France . | |
| 1242604 | 8/1960 | France . | |
| 7027090 | 8/1971 | France . | |
| 2367943 | 5/1978 | France . | |
| 136372 | 12/1919 | United Kingdom | 411/389 |
| 484654 | 5/1938 | United Kingdom | 411/389 |
| 642287 | 8/1950 | United Kingdom . | |
| 2057617A | 4/1981 | United Kingdom . | |

Primary Examiner—Everette A. Powell, Jr.
Attorney, Agent, or Firm—Bacon & Thomas

[57] ABSTRACT

The present invention relates to a fastening spindle and a method of attaching the rotor elements together utilizing the spindle. The system according to the invention reliably permits the visual inspection of the rotor assembly and to determine if it is properly tightened without the need for any additional post assembly inspection. The fastening spindle according to the invention has a central portion having a generally oblong cross-section with a first, major transverse dimension $d_1$ which is greater than a second, minor transverse dimension $d_2$; a first cylindrical portion which extends from the central portion in a first direction, the first cylindrical portion having a threaded distal end and a diameter $d_3$ such the $d_3$ is less than $d_2$; and a second cylindrical portion extending from the central portion in a second direction, the second cylindrical portion having a threaded distal end and a diameter $d_4$ such that $d_4$ is less than $d_2$. A transverse surface defined between one end of the central portion and the first cylindrical portion bears against one of the rotary elements to assure the proper axial positioning of the fastening spindle. The invention also comprises a system and a method for fastening a plurality of rotor elements together.

2 Claims, 3 Drawing Sheets

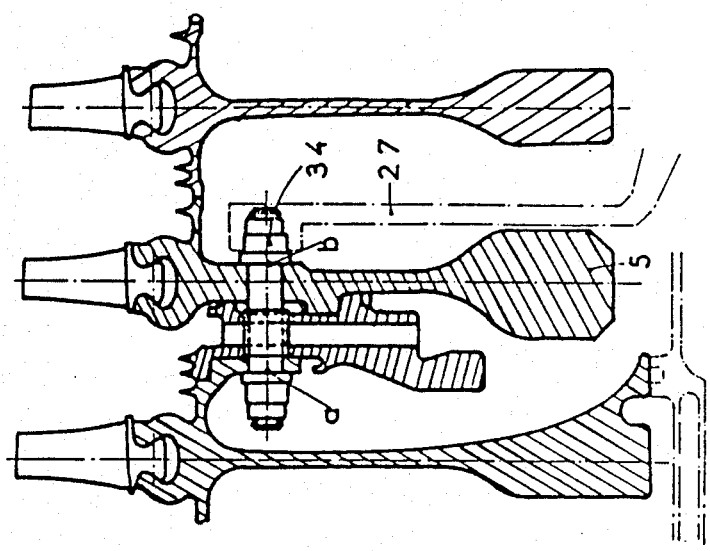
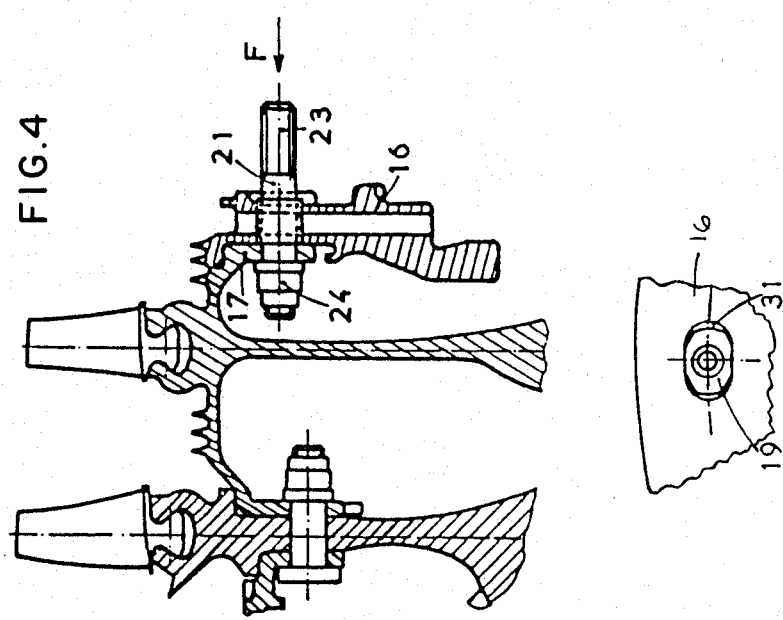
FIG. 4
FIG. 4a
FIG. 5

FASTENING SPINDLE AND METHOD OF ASSEMBLY FOR ATTACHING ROTOR ELEMENTS OF A GAS-TURBINE ENGINE

BACKGROUND OF THE INVENTION

The present invention relates to a spindle for fastening a plurality of rotor elements of a gas turbine engine together as well as a method for assembling the rotor elements utilizing the fastening spindle.

A gas turbine engine, such as an aircraft turbojet engine, typically has several stages or rotary elements comprising rotor wheels or discs with turbine blades attached thereto. The rotary elements are usually interconnected by bolts extending generally parallel to the rotational axis of the elements and extending through radial flanges formed on each of the rotary elements. This has proven a satisfactory method of fastening the rotary elements together where there is sufficient access on either side of the parts to install the bolt or threaded stud and attach nuts thereto. Generally, the bolts are placed through the flanges from the upstream to the downstream sides and are locked into position by holding the upstream head or nut while tightening a fastening nut on the downstream end. Devices of this type are shown in British Pat. No. 2,057,617 and French Pat. No. 2,065,837. However, these devices cannot be used when the rotor element flanges are located close to the rotor disc where the space between the disc and the flange is too small to place the bolt or stud into the hole in the flange.

To alleviate this problem, it has been proposed to utilize a threaded spindle having a central flange which is placed between the rotor elements such that the threaded spindle extends through holes formed in both of the rotor elements. This structure is shown in U.S. Pat. No. 3,447,822 and French Pat. No. 1,056,070. These devices have not completely solved the problem since they do not allow sufficient control over the tightening of the nuts on the threaded spindle. Furthermore, there are instances after the rotor elements are stacked together in which it is not possible to reach the upstream nut attached to the spindle thereby preventing the downstream nuts from being adequately tightened. Thus, utilizing this sytem, it is not possible to adequately verify if the nuts are properly tightened against the flange inside the upstream cavity. Furthermore, when the downstream nuts are being tightened, the spindles have a tendency to rotate, thereby loosening the upstream nuts.

The only way to verify the tightening of the upstream and downstream nuts is to measure the length of the spindle projecting outside the downstream nut. This has proven unsatisfactory since, if the tightening is improper, it is necessary to completely remove the threaded spindle and start the fastening process all over again.

SUMMARY OF THE INVENTION

The present invention relates to a fastening spindle and a method of attaching the rotor elements together utilizing the spindle which obviates the drawbacks of the known systems. The system according to the invention reliably permits the visual inspection of the asembly and to determine if it is properly tightened without any need for post assembly inspection.

Another object of the invention is to provide a fastening spindle for two or more rotary elements to enable the assembling of the elements to each other which permits out-of-sight fastening of the spindle to one of the flanges.

The fastening spindle according to the invention comprises a central portion having: a generally oblong cross-section with a first, major transverse dimension $d_1$ which is greater than a second, minor transverse dimension $d_2$; a first cylindrical portion which extends from the central portion in a first direction, the first cylindrical portion having a threaded distal end and a diameter $d_3$ such that $d_3$ is less than $d_2$; and a second cylindrical portion extending from the central portion in a second direction, the second cylindrical portion having a threaded distal end and a diameter $d_4$ such that $d_4$ is less than $d_2$.

a transverse surface defined between one end of the central portion and the first cylindrical portion bears against one of the rotary elements to assure the proper axial positioning of the fastening spindle.

The invention also comprises a system and a method for fastening a plurality of rotor elements together.

BRIEF DESCRIPTION OF THE FIGURES

FIG. 4 is a partial, cross-sectional view showing the installation of a second rotor element on the fastening spindle.

FIG. 4a is a partial view taken in the direction of arrow F in FIG. 4 showing the interengagement of the second rotor element with a fastening spindle.

FIG. 5 is a partial, cross-sectional view showing the attachment of a third rotor element to the fastening spindle and the final assembly of the rotary elements.

DETAILED DESCRIPTION OF THE PREFERRED EMBODIMENT

Figure 1:
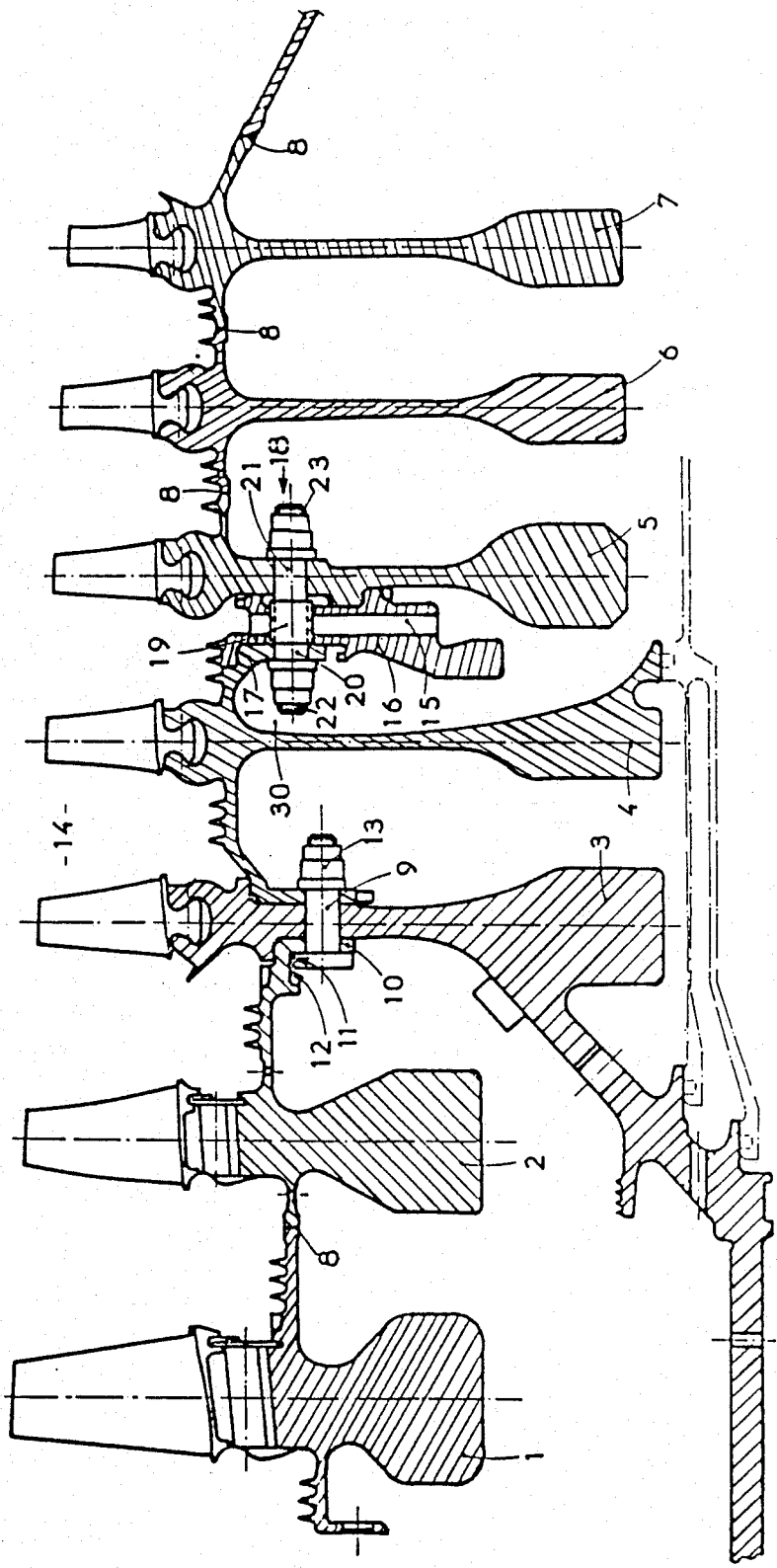
FIG. 1 is a partial, longitudinal cross-sectional view of a high pressure compressor portion of a gas turbine engine in which two stages of the compressor rotor are assembled according to the invention.

FIG. 1 is a partial, cross-sectional view of a high pressure compressor of a gas turbine engine showing the fastening system and method according to the invention. It should be understood, however, that the invention may also be utilized with turbine rotors of gas turbine engines.

The rotor shown in FIG. 1 comprises seven compression stages formed by rotor discs 1–7 joined together either by welding (or brazing) as indicated at 8, or by bolts or threaded fastening elements. The downstream flange of rotor disc 2 and the upstream flange of rotor disc 4 are each joined to intermediate rotor disc 3 by a plurality of bolts 9 extending in a longitudinal direction generally parallel to the rotational axis A. Typically, the bolt 9 is inserted from the upstream direction to the downstream direction (left to right as shown in FIG. 1) such that the bolt head bears against the downstream flange 10 of rotor disc 2. The available space between the rotor disc 2 and its downstream flange 10 is sufficient to enable the bolt 9 to be inserted through the three elements.

Bolt 9 may be prevented from rotating after assembly by the interengagement of flat surface 11 on the bolt head with surface 12 formed on the flange 10. Once the elements have been assembled, it is only necessary to tighten nut 13 to hold them in their assembled relationships.

The assembly of rotor disc 4 and 5 presents a different problem since the stages are located axially closer together than rotor discs 2 and 3, thereby preventing the installation of a bolt between the rotor discs of their associated flanges. Furthermore, the compressor may be provided with an air tap to remove a portion of air 14 passing across the rotor blades and direct it to the interior of the rotor drum to cool the downstream turbine stages.

The air tap comprises an intermediate collar 16 which is placed between the rotor discs 4 and 5 and which defines a plurality of centripetal conduits 15 designed to tap and accelerate a portion of the air to the interior of the rotor drum. In order to accommodate the intermediate collar 16 and to maintain the spacing between rotor discs 4 and 5, the downstream flange 17 on the rotor disc 4 must be located very close to the rotor disc. Therefore, the space 30 between the disc and the flange 17 is not sufficient to allow the insertion of a bolt through these elements. Thus, it is necessary to utilize a fastening spindle 18 according to the invention in order to affix these elements together.

Figure 2:
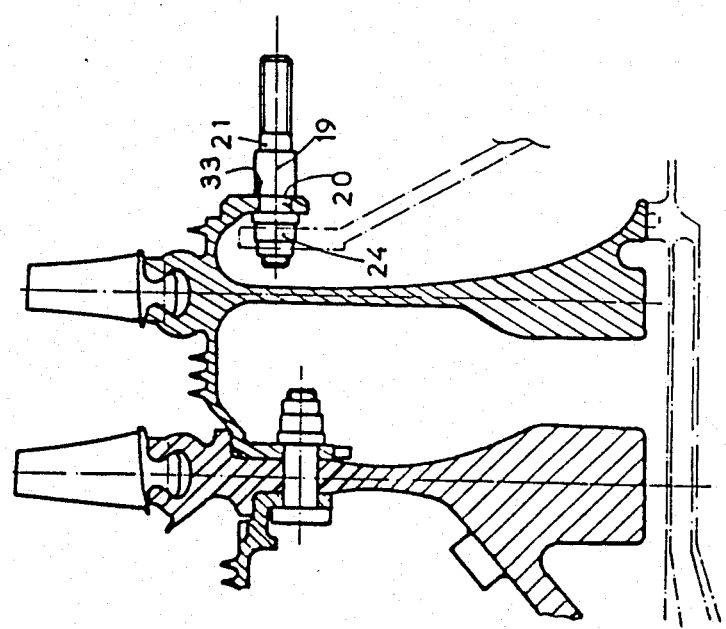
FIG. 2 is a partial, cross-sectional view of stages 3 and 4 of the compressor shown in FIG. 1 during installation of the fastening spindle according to the invention.

The fastening spindle according to the invention 18 has a central portion 19 with a generally oblong cross-section taken substantially perpendicular to the longitudinal axis having a major transverse dimension of $d_1$ and a minor transverse dimension of $d_2$ such that $d_1$ is greater than $d_2$. Extending from either side of the central portion in upstream and downstream directions, are first cylindrical portion 20 and second cylindrical portion 21, each having threaded distal ends 22 and 23, respectively. The first cylindrical portion has a diameter $d_3$ which is less than dimension $d_2$, while second cylindrical portion has a diameter $d_4$ which is also smaller than minor transverse dimension $d_2$. The central portion defines a generally transverse planar surface 33 adjacent the first cylindrical portion 20 which bears against the flange 17, as shown in FIG. 2. This serves to axially locate the fastening spindle 18 with respect to the flange 17.

Figure 3:
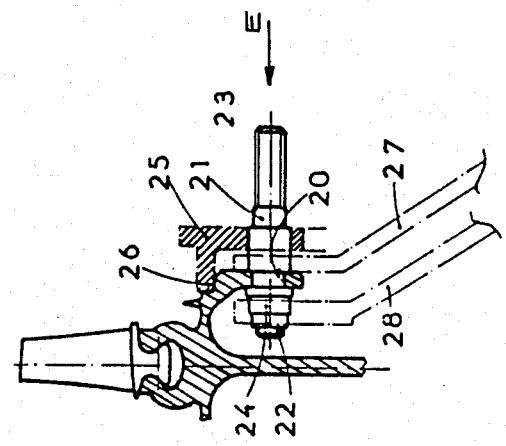
FIG. 3 is a partial, cross-section view of the fourth compressor stage shown in FIG. 2 during a subsequent assembly step of the fastening spindle.
Figure 3A:
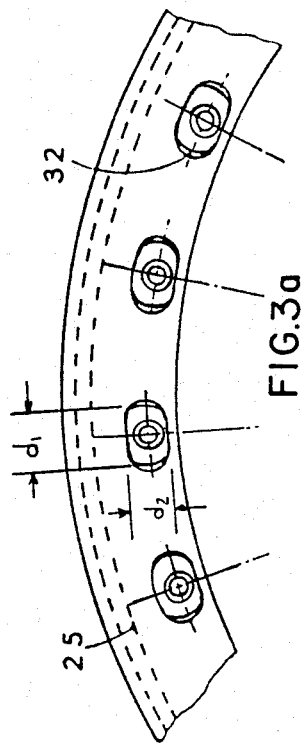
FIG. 3a is a view in the direction of arrow E in FIG. 3 showing the interengagement of the fastening spindles with the assembly tool.

The method of assembling the elements comprises placing the first cylindrical portion 20 of fastening spindle 18 through a generally circular opening formed in the flange 17 until the transverse surface 33 contacts the downstream side of the flange. Nut 24 is then threadingly engaged with the distal end 22. Assembly tool 25 which comprises a generally annular portion defining a plurality of generally oblong openings therein, the openings sized so as to slidably engage the central portions 19 of each of the fastening spindles 18, is placed over each of the fastening spindles, as shown in Fig. 3, until axial flange 26 rests against an upper portion of flange 17. The interengagement of the oblong openings with the central portions 19 of each of the fastening spindles 18 prevents their rotation while nuts 24 are tightened with spanner 27 and wrench 28.

After tightening all of the nuts 24 for the fastening spindles, the tool 25 is withdrawn and the intermediate collar 16 is placed in position over the central portions of all of the fastening spindles, as shown in FIG. 4. Intermediate collar 16 defines a plurality of generally oblong openings 31 therein adapted to slidably engage the central portions 19 of each of the fastening spindles 18 as shown in FIG. 4a.

Rotor disc 5 is then placed in position by passing the cylindrical portions 21 of the fastening spindles 18 through corresponding openings in the rotor disc 5. Nuts 34 are then assembled with threaded distal end 23 and tightened by torque wrench 27. During this tightening operation, rotation of the fastening spindles 18 is prevented due to the mutual interengagement of the oblong portions 19 with the oblong openings 31 so as to prevent loosening of nuts 24.

The fastening spindle, the system and the method of assembly according to this invention ensures that the flanges of rotor discs 4 and 5 are tightened between surface a of the collar 17 and the surface b of the rotor disc 5 without further verification following assembly. Thus, the spindles and their method of assembly according to this invention are applicable to small rotor discs for which, following assembly of the elements, an upstream facing bolt head is no longer accessible. The method according to the invention allows the assembling of such elements with the upstream nut or bolt head completely out of sight and inaccessible following the assembly of the elements.

The foregoing is provided for illustrative purposes only and should not be construed as in any way limiting this invention, the scope of which is defined solely by the appended claims.

I claim:

1. A method of assembling rotor elements of a gas turbine engine comprising the steps of:
    (a) providing a first rotor disc having a body portion and a flange extending generally parallel to, but spaced from, the body portion, the flange defining a plurality of generally circular openings;
    (b) providing a plurality of spindles, each spindle comprising:
        (i) a central portion with a generally oblong transverse cross-section having a first major transverse dimension $d_1$ greater than a second minor transverse dimension $d_2$;
        (ii) a first cylindrical portion extending from a first side of the central portion having a threaded distal end and a diameter $d_3$ such that $d_3 < d_2$; and,
        (iii) a second cylindrical portion extending from a second side of the central portion having a threaded distal end and a diameter $d_4$ such that $d_4 < d_2$;
    (c) inserting a first cylindrical portion into each circular opening through the flange such that the threaded distal end extends into the space between the flange and the body portion of the first rotor disc and the central portion contacts the flange;
    (d) placing a retaining tool having a plurality of oblong openings over the spindles such that the central portions non-rotatably extend into the oblong openings to prevent the spindles from rotating;
    (e) applying and tightening a nut onto the threaded ends of the first cylindrical portion of each spindle;
    (f) removing the retaining tool;
    (g) placing an intermediate collar having a plurality of oblong openings adjacent to the first rotor disc such that the central portions of the spindles nonrotatably extend through the oblong openings;

(h) placing a second rotor disc having a plurality of circular openings onto the second cylindrical portions such that the threaded ends of the second cylindrical portions extend through the openings; and, (i) applying and tightening a nut onto the threaded end of the second cylindrical portion of each spindle.

2. A system for fastening a plurality of rotor elements of a gas turbine engine comprising:

(a) a first rotor disc having a body portion and a flange extending generally parallel to, but spaced from, the body portion, the flange defining a plurality of generally circular openings;

(b) a plurality of spindles, each spindle comprising:
(i) a central portion with a generally oblong transverse cross-section having a first major transverse dimension $d_1$ greater than a second minor transverse dimension $d_2$;
(ii) a first cylindrical portion extending from a first side of the central portion having a threaded distal end, a diameter $d_3$ such that $d_3 < d_2$ and extending through a generally circular opening in the flange; and,
(iii) a second cylindrical portion extending from a second side of the central portion having a threaded distal end and a diameter $d_4$ such that $d_4 < d_2$;

(c) first nut means attached to the first cylindrical portion between the flange and the body portion of the first rotor disc such that the central portion is in contact with the flange;

(d) an intermediate collar having a plurality of oblong openings located adjacent to the first rotor disc such that the central portions of the spindles nonrotatably extend through the oblong openings;

(e) a second rotor disc defining a plurality of generally circular openings located adjacent to the intermediate collar such that the second cylindrical portions of the spindles extend through the openings in the second rotor disc; and, (f) second nut means threaded onto the distal end of the second cylindrical portion and bearing against the second rotor disc.

* * * * *

UNITED STATES PATENT AND TRADEMARK OFFICE
CERTIFICATE OF CORRECTION

PATENT NO. : 4,844,694

DATED : July 4, 1989

INVENTOR(S) : Jacky NAUDET

It is certified that error appears in the above-identified patent and that said Letters Patent is hereby corrected as shown below:

Title page:

IN THE ABSTRACT, line 13, "such the" should be --such that--.

Column 2, line 16, "a" should be --A--.

Signed and Sealed this

Third Day of April, 1990

Attest:

HARRY F. MANBECK, JR.

*Attesting Officer*      *Commissioner of Patents and Trademarks*